United States Patent [19]

Kautt

[11] Patent Number: 5,095,614

[45] Date of Patent: Mar. 17, 1992

[54] AUTOMATIC WINDOW FRAME LOCK ASSEMBLY INSTALLATION

[75] Inventor: Jean-Jacques Kautt, Strasbourg, France

[73] Assignee: FERCO International USINE DE FERRURES DE BATIMENT, Sarrebourg, France

[21] Appl. No.: 550,824

[22] Filed: Jul. 11, 1990

[30] Foreign Application Priority Data

Jul. 13, 1989 [FR] France ................. 89 09558

[51] Int. Cl.$^5$ .................................................. B23P 21/00
[52] U.S. Cl. ........................................ 29/771; 29/33 P; 29/430; 29/795; 29/787
[58] Field of Search .............. 29/33 P, 430, 525.2, 29/564, 564.1, 568, 710, 771, 783, 787, 788, 791, 795, 796, 822, 823; 198/456, 457, 602, 465.1

[56] References Cited

U.S. PATENT DOCUMENTS

| | | | |
|---|---|---|---|
| 4,492,297 | 1/1985 | Sticht | 198/465.1 X |
| 4,930,212 | 6/1990 | Kautt | 29/796 X |
| 4,934,043 | 6/1990 | Kautt | 29/796 |
| 4,936,009 | 6/1990 | Kautt | 29/796 |

FOREIGN PATENT DOCUMENTS

| | | |
|---|---|---|
| 0305732 | 3/1989 | European Pat. Off. |
| 0309371 | 3/1989 | European Pat. Off. |
| 1677198 | 3/1970 | Fed. Rep. of Germany |
| 2589933 | 5/1987 | France |
| 2627117 | 8/1989 | France |

Primary Examiner—Joseph M. Gorski
Assistant Examiner—S. Thomas Hughes
Attorney, Agent, or Firm—Fidelman & Wolffe

[57] ABSTRACT

An installation for automatically assembling basic parts of a tilt/turn window lock fitting comprises a line for the automatic assembly of the various basic parts constituting the corner turner and, associated therewith, a line for the automatic assembly of the strap, the link, at least one locking roller and at least one pressure spring to the corner turner assembly. The two lines are preferably made up of modular stations in two parallel planes linked by a transverse conveyor.

13 Claims, 6 Drawing Sheets

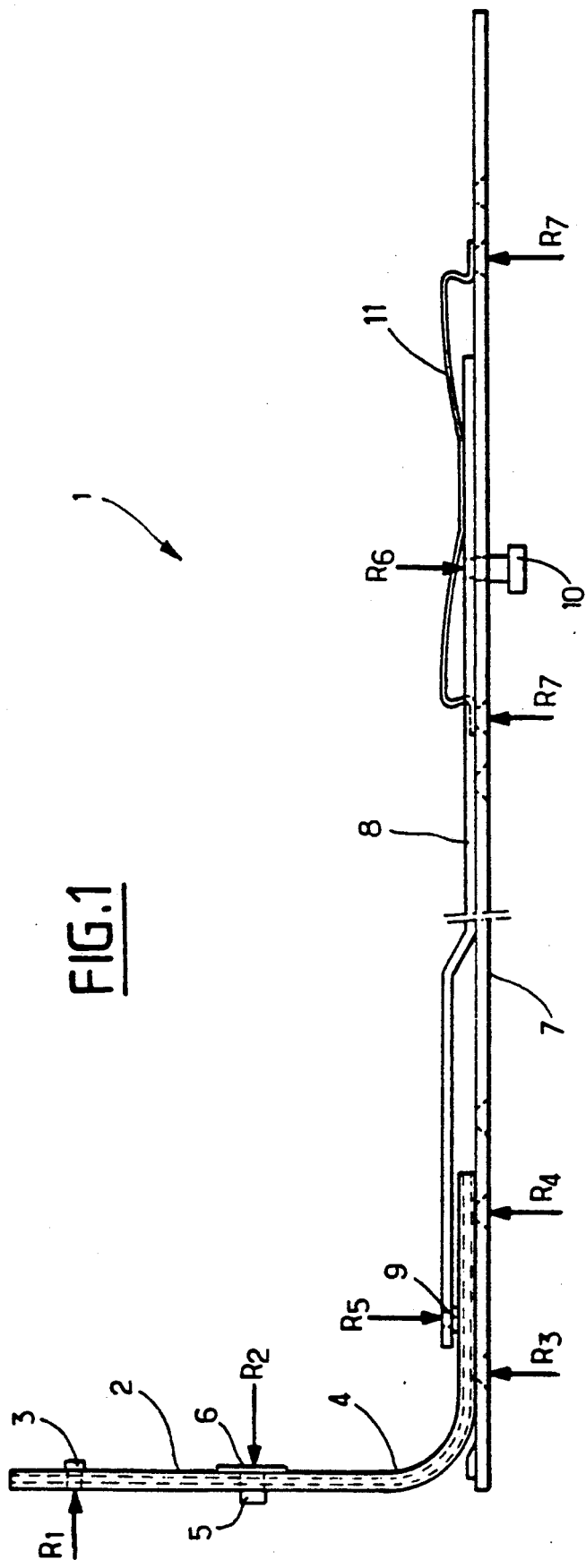

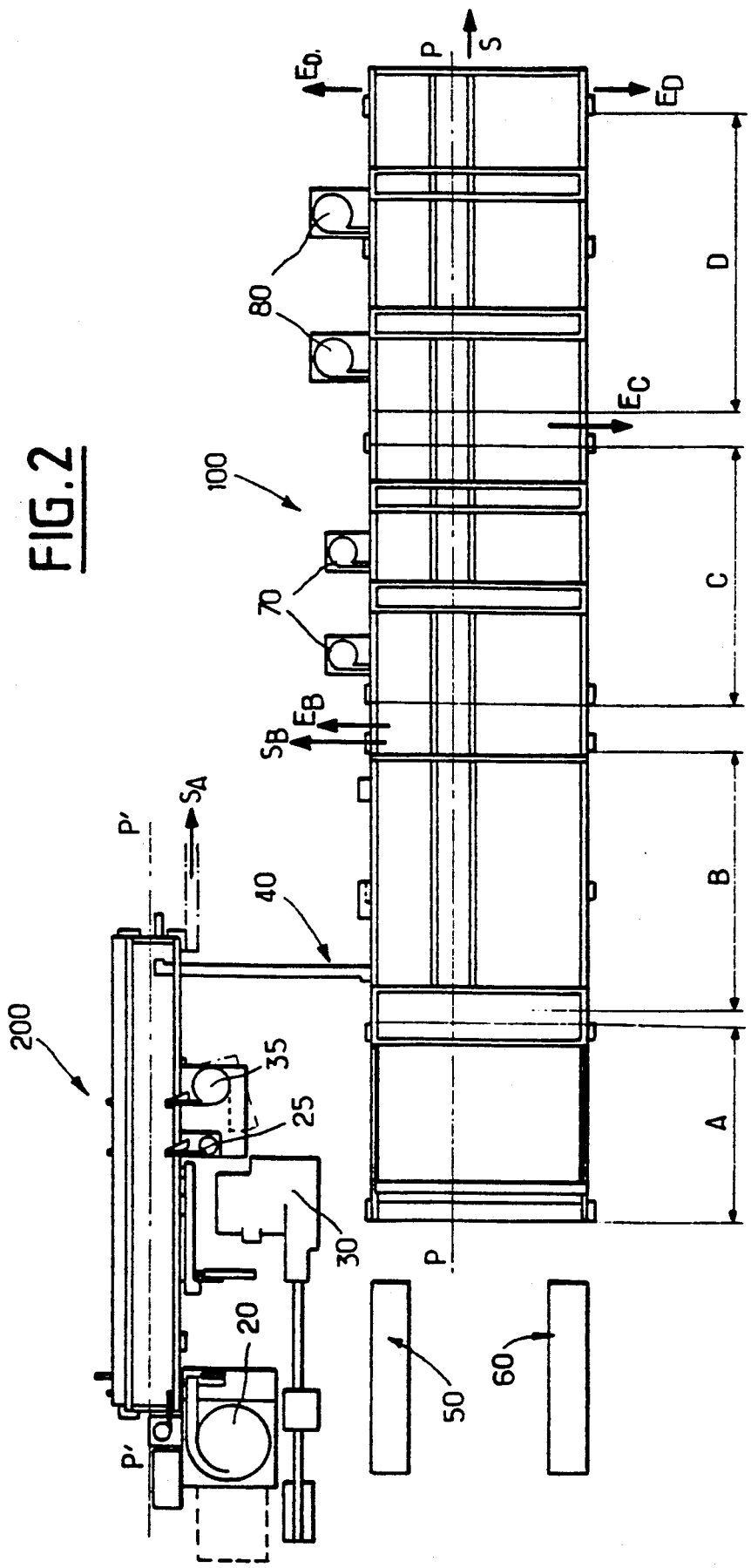

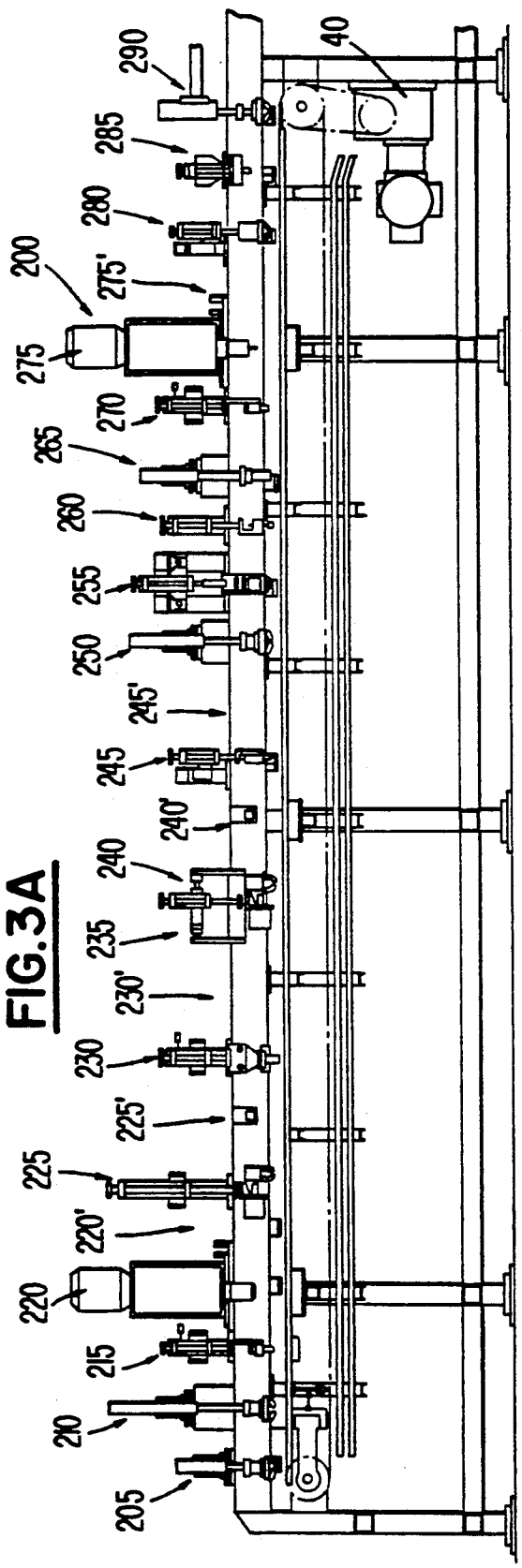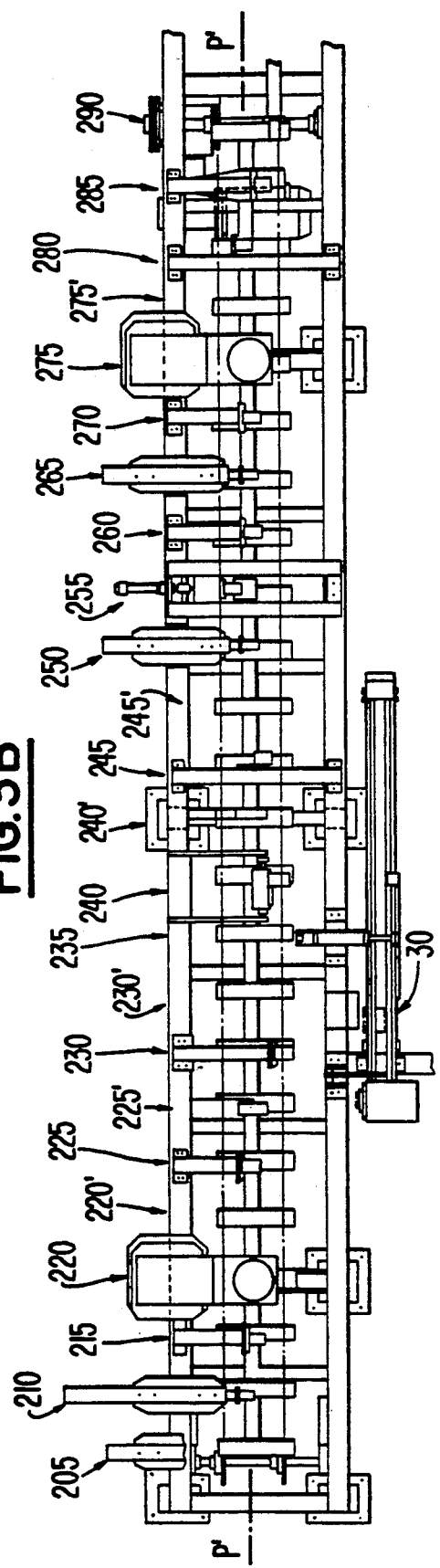

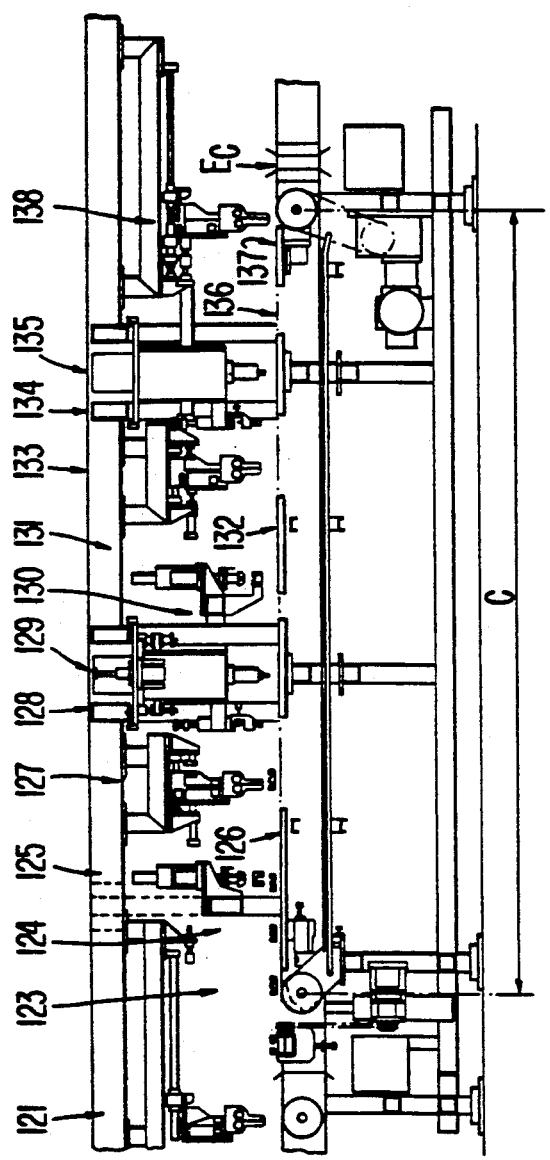
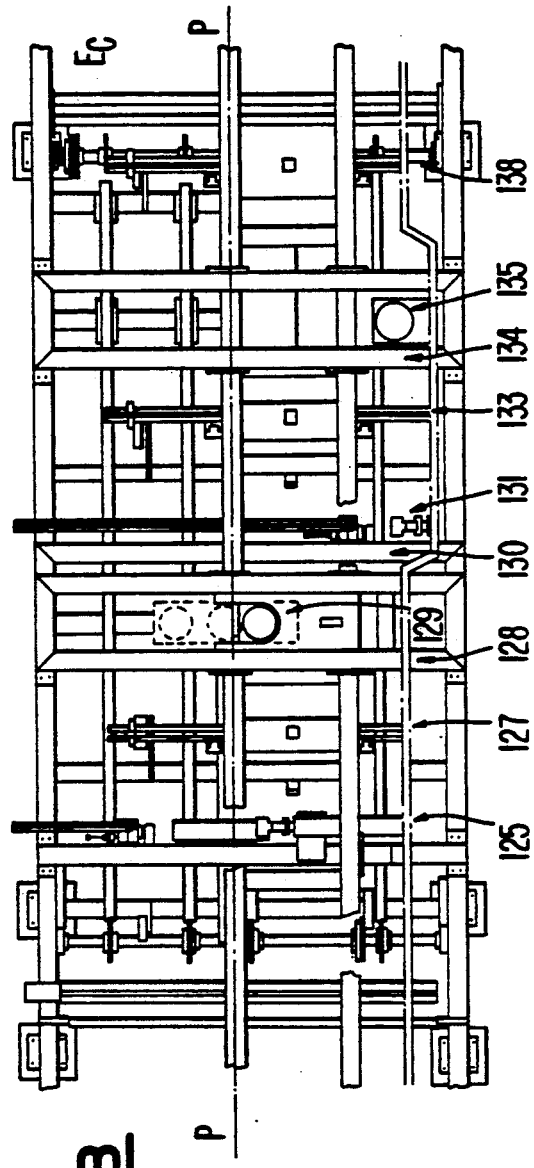

AUTOMATIC WINDOW FRAME LOCK ASSEMBLY INSTALLATION

BACKGROUND OF THE INVENTION

1. Field of the invention

The invention concerns an installation for the automatic assembly of a window frame fitting constituting a locking device, in particular a side locking device designed to be mounted on opening frames of tilt/turn windows.

2. Description of the Prior art

This fitting serves to increase the number of points at which a tilt/turn window can be locked by providing locking rollers on the bottom crossmember and/or the rear upright of the opening frame. Using this locking device, the movements of the links (front vertical espagnolette bolt and top horizontal strap) operated by the handle of the lock, are transmitted to the crossmembers and the uprights of the opening frame.

Striking boxes mounted on the bottom crossmember or on the upright of the fixed frame cooperate with the locking roller(s). The side lock comprises one or two locking rollers, depending on the size of the window.

To facilitate a better understanding of the invention, the fitting constituting the side lock is shown in FIG. 1.

The side lock 1 essentially comprises an angle-bracket 2, usually of brass, a strap 7, a link 8 and a locking roller 10.

The angle-bracket 2 has a lipped U-shape cross-section forming a guide rail for a spring assembly 4 preferably comprising a bundle of leaf springs transmitting the sliding motion of the links around the corner of the opening frame. One end of this bundle of leaf springs 4 carries an attachment pin 5 for coupling the fitting 1 to the link of another fitting. The pin 5 is held in an orifice in the leaf springs 4 by riveting it at R2 into a spacer 6. The other end of the bundle of leaf springs 4 carries a pin 9 on the open side of the rail to which one end of the link 8 is riveted at R5. Finally, the angle-bracket comprises a locking pin 3 riveted at R1 at a point near its free end. The angle-bracket 2 provided in this way with the (usually steel) leaf springs 4 constitutes a "corner turner". The corner turner is fixed (usually welded) to a strap 7 and in the case of the present invention it is riveted at R3, R4 into recesses on the strap 7. The link 8 slides on the strap 7. It is riveted at R5 to the pin 9 at one end and is acted on by a leaf spring 11 at a point near its other end. Near this latter end the link 8 has riveted to it at R6 the locking roller 10 designed to cooperate with a striking box on the fixed frame and extending through an oblong aperture in the strap. The spring 11 is usually a simple leaf spring held onto the strap 7 by two pins riveted to the latter. In accordance with the invention, and in order to facilitate automatic assembly, the spring is a perforated omega-shaped leaf spring whose ends bear on the strap 7, as shown in FIG. 1, directly at one end and through an oblong orifice in the link 8 at the other end. It is riveted at R7 into two recesses on the strap 7.

If the opening frame is large, more than one (usually two) locking rollers 10 and the corresponding number of pressure springs 11 may be provided along the strap 7 and the link 8.

At present, such side locking devices are manufactured on assembly lines on which each assembly operation is carried out manually.

The invention proposes a system suitable for the automatic assembly of side lock fittings for window frames, especially for tilt/turn windows.

The successive manual assembly operations result in high production costs because of the large number of handling operations and the time wasted in taking up, positioning and assembling the parts. What is more, the assembly time is inherently dependent on the know-how and dexterity of the operator, leading to significant variations in manufacturing cycles and quality, which compromise productivity and profitability. The operator has to take one or two basic parts from receptacles (in which they are stored loose in bulk per category), fit them together by hand, insert the assembly into a riveting tool to make the riveted joint and then check for correct execution.

These operations are time-consuming and awkward because of their repetitive nature and soon lead to significant reduction in yield.

An object of the present invention is therefore to remedy these disadvantages and to this end the invention concerns an installation in which all the various assembly operations are automated and integrated into a continuous process.

SUMMARY OF THE INVENTION

The present invention consists in an installation comprising means for automatically assembling basic parts of a window lock fitting, namely: a corner turner comprising an angle-bracket forming a guide rail, a spring device adapted to transmit sliding motion of links at the corner of a frame, an attachment pin adapted to connect said corner turner to a link of another fitting and passing through an orifice in said spring device, a spacer riveted to the pin and a locking pin riveted to the free end of the angle-bracket; a strap to which the corner turner is fixed; a link attached to the end of the spring device and receiving at least one locking roller; and a riveted spring.

In a preferred embodiment the installation in accordance with the invention includes an automatic assembly line for assembling the basic parts of the corner turner, namely the angle-bracket, the locking pin, the spring device, the attachment pin and the spacer.

This line preferably comprises modular stations disposed in a common plane.

The installation is further characterized in that it includes an automatic assembly line for assembling basic parts comprising the corner turner assembly, the strap and the link.

This line also preferably comprises modular stations disposed in a common plane.

The invention is further characterized in that it includes an automatic assembly line for assembling basic parts comprising the corner turner assembly, the strap, the link and at least one locking roller.

This line also preferably comprises modular stations disposed in a common plane.

The installation may also comprise an automatic assembly line for assembling at least one spring to the assembly comprising a corner turner, a strap, a link and at least one locking roller.

This line also preferably comprises modular stations disposed in a common plane.

In a preferred but non-limiting embodiment the last three assembly lines mentioned above are disposed one after the other to form a continuous automatic assembly line for assembling the lock fitting.

In this case, the automatic assembly line for assembling the basic parts of the corner turner is preferably parallel to the continuous automatic assembly line for assembling the lock fitting, the two assembly lines being linked by a transverse conveyor.

The invention is described in more detail hereinafter with reference to the appended drawings showing a preferred embodiment.

BRIEF DESCRIPTION OF THE DRAWINGS

FIG. 1 has already been described.

FIG. 2 is a plan view of a complete automatic assembly installation in accordance with the invention.

FIGS. 3A and 3B are side and plan views of an assembly line for assembling the basic parts of the corner turner.

FIGS. 5A and 5B are side and plan views of a second side lock fitting assembly line.

DETAILED DESCRIPTION OF THE INVENTION

Figure 4A:
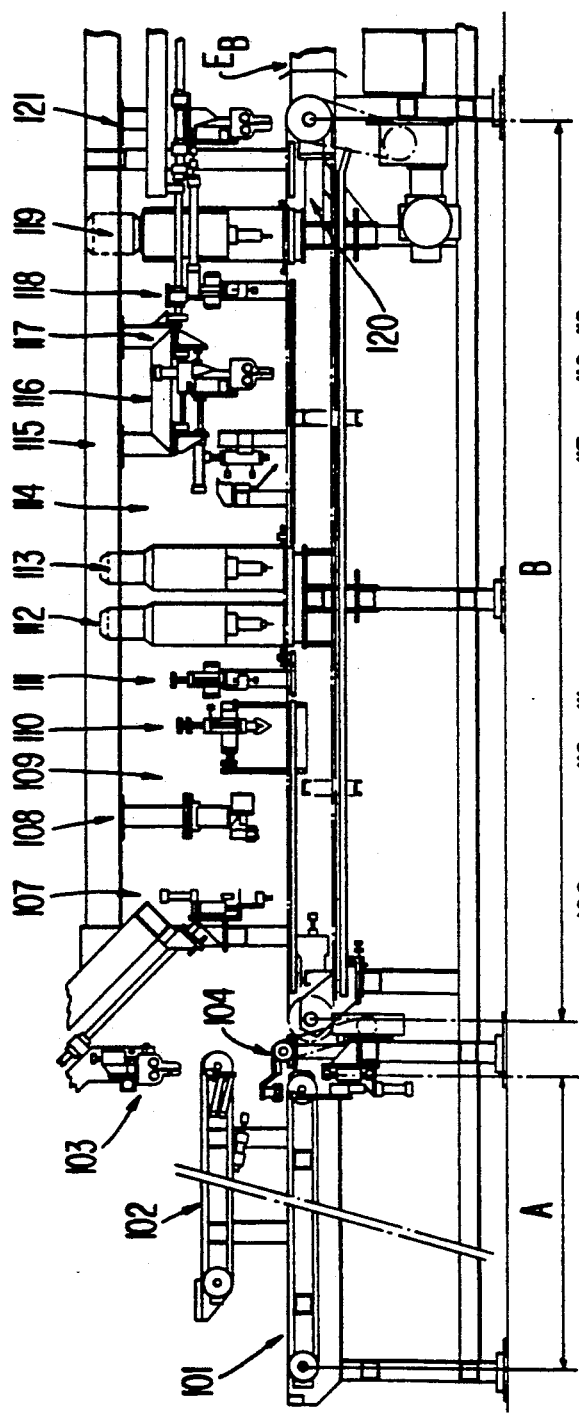
FIGS. 4A and 4B are side and plan views of a line for loading links and straps associated with a first side lock fitting assembly line.

The installation for the automatic assembly of parts of a side lock fitting is shown in plan view in FIG. 2. It comprises a main automatic assembly line 100 for assembling the straps 7, links 8 and their accessories 9, 10, 11 with the corner turner assembly 2 through 6.

To this end there is also provided an automatic assembly line 200 for the basic parts 2 through 6 of the corner turner.

The main side lock fitting assembly line 100 and the corner turner assembly line 200 are made up of modular stations disposed in respective parallel planes PP and P'P'.

These assembly lines are associated with devices for feeding the component parts.

The assembly line 200 carries out the following operations:

riveting the locking pin 3 to the angle-bracket 2 at R1, fitting the bundle of springs 4 into the angle-bracket 2, and riveting the attachment pin 5 to the bundle of springs 4 and the spacer 6 at R2.

At the entry end of the assembly line 200, there is therefore provided a device 20 for feeding bare angle-brackets 2, preferably provided with a hopper. To the side of the line 200 is a device 30 for making up and feeding the bundles of leaf springs 4. The device 30 is preferably a known automatic device used until now as an individual assembly station. Also provided are an automatic feed station 25 for feeding attachment pins 5 and an automatic feed station 35 for feeding spacers 6.

A transverse (preferably belt-type) conveyor 40 transfers the corner turners from the line 200 to the line 100.

At the entry end of the latter are two storage areas, a storage area 50 for the straps 7 and a storage area 60 for the links 8. To the side of the main line 100 are two feed devices 70 for feeding the locking rollers 10 and two feed devices 80 for feeding the pressure springs 11. In the embodiment described the side lock provides two locking points.

The line 100 carries out the following operations:

riveting the strap 7 to the angle-bracket assembly at R3, R4, riveting the link 8 to the attachment pin/link/spring assembly at R5, riveting one or two locking rollers 10 to the link 8 at R6, and riveting one or two pressure springs 11 to the strap 7 at R7.

To this end the system is made up of three transfer areas to be described in more detail later. A front area A contains the conveyor devices for loading the straps 7 and the links 8. The straps and the links are loaded onto these manually by a single operative who takes the parts from their respective storage area 50, 60 and places them on the conveyors in area A.

The automatic line 100 comprises three transfer and automatic assembly areas B, C, D each comprising at its outlet end at least one device for discarding defective parts, symbolically represented by the arrows $E_B$, $E_C$, $E_D$; satisfactory finished locks are taken off from the end of the line (arrow S).

The assembly line for the angle-brackets 200 has a (preferably chain- or belt-type) stepwise transfer conveyor.

The main line has three (preferably chain- or belt-type) stepwise transfer conveyors. Each area B, C and D therefore includes a conveyor.

The basic parts are dispensed by means of vibrating bowls and the parts are placed into transfer tools by manipulators. The components are cold riveted.

FIGS. 3A and 3B show the automatic assembly line 200 for the basic parts of the corner turner in more detail.

As already explained, the assembly line 200 is made up of modular stations disposed in a plane P'P'. These modular stations are:

a station 205 for placing the locking pin 3 into the transfer tool, a station 210 for placing the angle-bracket 2 onto the locking pin 3, a station 215 for checking the placing of the angle-bracket onto the locking pin, a station 220 for riveting the locking pin 3, a spare station 220', a station 225 for rotating these assembled parts through 90°, a spare station 225', a station 230 for placing and lubricating the leaf springs 4, a spare station 230', a station 235 for finishing the placing the leaf springs 4, a station 240 for rotating the assembled parts through 90°, a spare station 240', a station 245 for positioning the leaf springs 4 to enable fitting of the attachment pin 5, a spare station 245', a station 250 for placing the attachment pin 5 into the transfer tool, a station 255 for placing the angle-bracket and the leaf springs onto the attachment pin 5, a station 260 for checking the placing of the angle-bracket and the leaf springs onto the pin 5, a station 265 for placing the spacer 6 onto the pin 5, a station 270 for checking the placing of the spacer 6 onto the pin 5, a station 275 for riveting the pin 5 to the spacer 6, a spare station 275', a station 280 for repositioning the angle-bracket assembly for its operation to be tested, a station 285 for testing its operation, and a station 290 for offloading the corner turner assembly onto the transfer line 40 or discarding defective corner turners.

As already mentioned, the bundles of leaf springs 4 are made up and distributed by the automatic device 30. The transverse transfer line 40 (preferably comprising a conveyor belt) transfers the corner turner assemblies to the main automatic line 100 which will now be described in more detail.

Figure 4B:
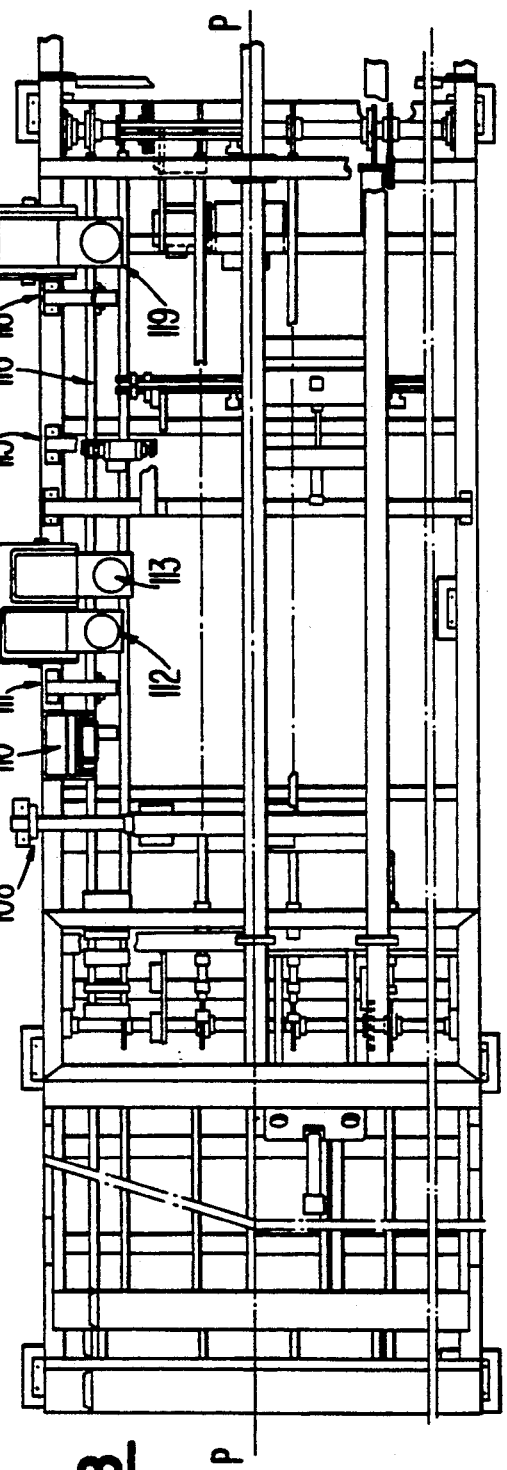
Figures 6A, 6B:
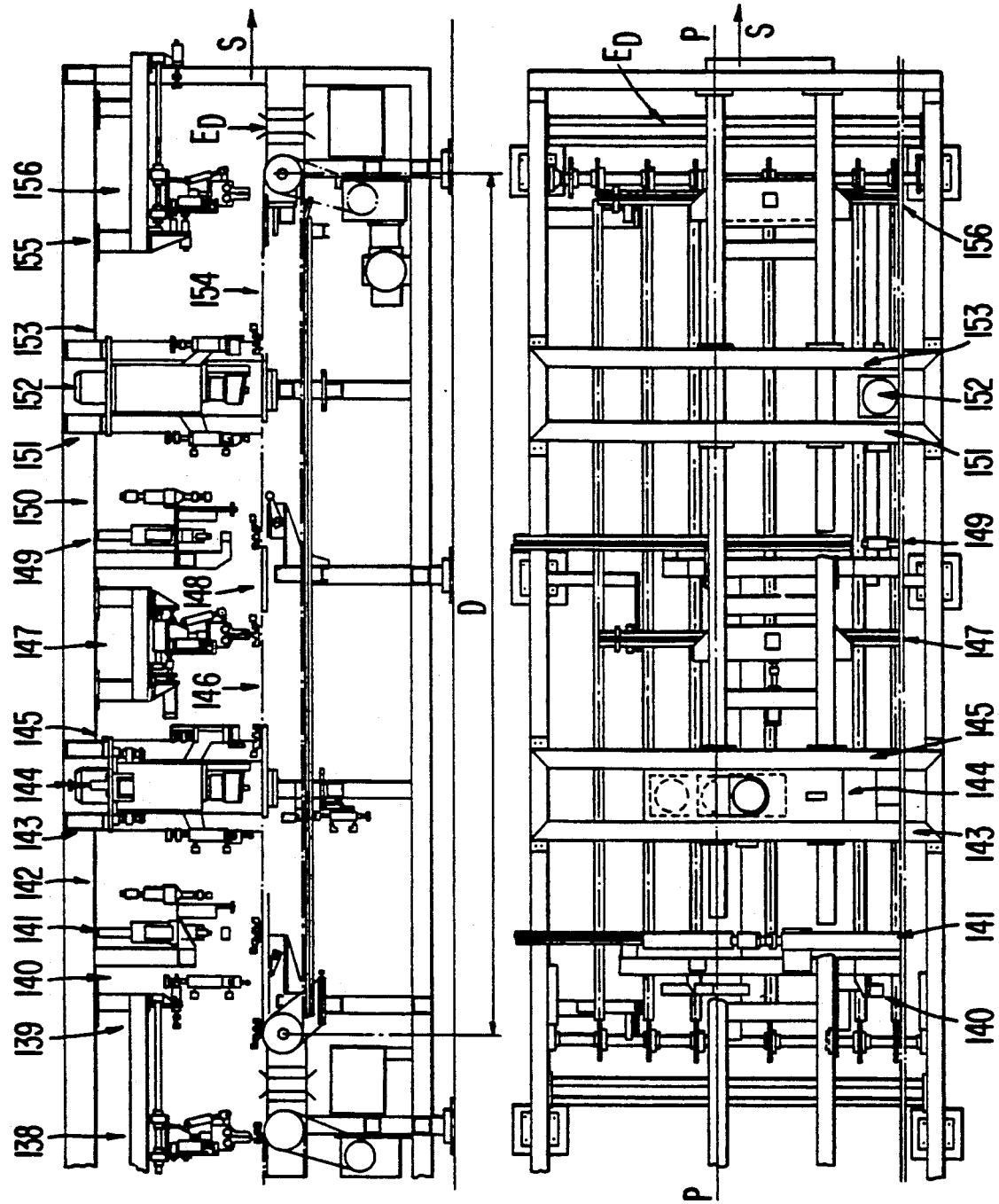
FIGS. 6A and 6B are side and plan views of a third side lock fitting assembly line.

FIGS. 4A and 4B show the first two transfer areas A and B.

The transfer area A comprises two conveyor belts, a stepwise lower conveyor belt 101 for loading the straps and a stepwise upper conveyor belt 102 for loading the links. At the exit end of the conveyor 101 the strap is taken up by the device 104 which is a loading overturner rotating about a horizontal axis and which places the strap at the entry end of the area B conveyor, turning the strap through 180°. The holding device 103 for loading the links is mounted on a tilted slide so as to lower the link from a high position to a low position at the entry end of the area B conveyor.

The stepwise transfer area B comprises a series of modular stations disposed in the plane PP, to be more precise:

a station 107 for checking the presence of recesses on the strap, a station 108 for placing the angle-bracket assembly 2 into the transfer tool, this station cooperating with the transfer conveyor 40 to recover the angle-bracket assembly and transfer it to the area B conveyor, a spare station 109, a station 110 for placing the angle-bracket assembly onto the strap, a station 111 for checking the placing of the angle-bracket onto the strap, a station 112 for riveting the angle-bracket to the strap, a second station 113 for riveting the angle-bracket to the strap, optionally, a station for checking the riveting, a spare station 114, a station 115 for placing the pin 9 onto the leaf springs 4 of the angle-bracket, a station 116 for placing the link 8 onto the pin 9 of the leaf springs 4, a spare station 117, a station 118 for checking the placing of the link 8, a station 119 for riveting the link, a spare station 120, and a two-position offloading handling station 121 which transfers satisfactory locks into area C and discards defective locks (arrow $E_B$); this offloading station essentially comprises a holding device moving on a horizontal slide.

FIGS. 5A and 5B show the next transfer station C. The holding device of the offloading and loading station 121 transfers the fitting to the position 123 at the entry end of the area C conveyor. The area C comprises the following modular stations aligned with the previous stations:

a spare station 124, a station 125 for placing the first locking roller 10 into the transfer tool, a spare station 126, a station 127 for placing the strap 7 and the link 8 onto the locking roller 10, a station 128 for checking the placing of the strap 7 and the link 8 onto the roller 10, a station 129 for riveting the roller 10, a spare station 130, a station 131 for fitting the second locking roller into the transfer tool, a spare station 132, a station 133 for placing the strap and the link onto the second locking roller, a station 134 for checking the placing of the strap and the link onto the second locking roller, a station 135 for riveting the second locking roller, a two spare stations 136, 137, and a two-position offloading holding station 138 similar to the previous offloading station 121 and transferring sound locks into the third transfer area D and discarding defective locks ($E_C$).

At this stage the fitting is placed at the entry end of the area D conveyor in the position 139 by the offloading station 138. The area D comprises a number of modular stations aligned with the previous stations, to be more precise:

a station 140 for checking the presence of the locking rollers 10, a station 141 for placing a first spring 11 onto the strap 7, a greasing station 142, a station 143 for checking the placing of the first spring onto the strap, a station 144 for riveting the spring 11, this station 144 carrying out the riveting at the first recess in the strap and the riveting at the second recess in the strap and finally checking the riveting, a station 145 for unlocking the spring, the three stations 143, 144 and 145 being mounted on a common frame, a spare station 146, a station 147 for repositioning the side locks, a spare station 148, a station 149 for placing the second spring onto the strap, a greasing station 150, a station 151 for checking the placing of the second spring onto the strap, a station 152 for riveting the second spring, this station carrying out the riveting at the first recess on the strap, the riveting at the second recess on the strap and finally the checking of the riveting of this spring, a station 153 for unlocking the spring, the three stations 151, 152 and 153 being mounted on a common frame, a spare station 154, a station 155 for checking the general operation of the finished side lock, and a station 156 similar to the previous offloading stations 121 and 138 for offloading the finished locks and discarding defective locks ($E_D$).

A packaging operative works at the exit end of the automatic line PP (arrow S).

The discard exits $E_B$, $E_C$ and $E_D$ are gravity-fed reject chutes.

The resulting automatic assembly installation is approximately 16 m long and between 5 and 6 m wide. Its instantaneous throughput is approximately 600 parts per hour with a yield of 0.75, that is a practical throughput of approximately 450 parts per hour. The installation requires two operators for supplying the straps, links and various other components and one operator to pack finished fitting at the exit from the machine.

It goes without saying that the side lock described with reference to FIG. 1 is just one example of a fitting made on the installation in accordance with the invention. Alternative locks (different sizes, different accessories, different arrangements, etc.) can also be made by adapting the stations and transfer devices as necessary.

Other automatic or semi-automatic assembly lines can be added to this basic installation.

Specifically, as shown in FIG. 2, an auxiliary exit $S_A$ may be provided at the end of the corner turner assembly line 200. At this exit the corner turner is transferred, for example by a conveyor parallel to the line 200, to manual or automatic assembly stations providing, for example, for assembling locks with corner turners and short straps, the locking roller 10 being riveted near the pin 9. The additional assembly line is then a partial line of the same type as the complete line 100 described, with a specific arrangement of the lines B, C, D.

Also, an exit $S_B$ may also be provided laterally of the line 100. At this stage of the assembly line 100 the corner turner is riveted to the strap and the link is placed and/or riveted onto the pin 9 of the leaf springs. At this stage the fitting can be completed in an automatic or semi-automatic auxiliary line to produce, for example, fittings without the spring 11 or the riveting at R7, the link being held to the strap by a guide member riveted to the strap 7 and retaining the link 8.

There is claimed:

1. An apparatus for continuous assembly of window lock fittings comprising:
   (A) first assembly means for automatically assembling an angle bracket assembly comprising:
      (i) first positioning means for automatically positioning an angle bracket and a locking pin near a first end of said angle bracket; and first fastening means for automatically fastening the locking pin to said first end of said angle bracket to obtain a first subassembly; and
      (ii) second positioning means for automatically positioning said first subassembly, a first leaf spring and an attachment pin for connecting said first leaf spring to said first subassembly near a second end of said angle bracket; and second fastening means for automatically fastening said first assembly to said first leaf spring with said attachment pin to obtain said angle bracket assembly;
   (B) third positioning means for automatically positioning said angle bracket assembly and a strap for connection of a first end of said strap to said second end of said angle bracket; and third fastening means for automatically fastening said angle bracket assembly to said strap;
   (C) fourth positioning means for automatically positioning said strap and a link for connection to a second end of said strap with a locking roller; and fourth fastening means for automatically fastening said strap to said link with said locking roller; and
   (D) fifth positioning means for automatically positioning a second leaf spring for connection to said strap; and fifth fastening means for automatically fastening said second leaf spring to said strap.

2. The apparatus according to claim 1, further comprising first checking means for automatically checking positions of said angle bracket and said locking pin; second checking means for automatically checking positions of said first subassembly, said first leaf spring and said attachment pin third checking means for automatically checking the position of said angle bracket assembly and said strap; fourth checking means for automatically checking the position of said strap and said link; and fifth checking means for automatically checking the position of said strap and said second leaf spring.

3. The apparatus according to claim 3, further comprising first testing means for automatically testing the function of said angle bracket assembly.

4. The apparatus according to claim 3, wherein each of said first positioning means, first checking means, first fastening means, second positioning means, second checking means, second fastening means and first testing means is disposed in a modular station, the stations forming a first line of stations with each station connected to an adjacent station by a conveyor.

5. The apparatus according to claim 3, wherein each of said first positioning means, first checking means, first fastening means, second positioning means, second checking means, second fastening means and first testing means is disposed in a modular station, the stations forming a first line of stations with each station connected to an adjacent station by a conveyor;
   each of said third positioning means, third checking means and third fastening means is disposed in a modular station, the stations forming a second line of stations with each station connected to an adjacent station by a conveyor;
   each of said fourth positioning means, fourth checking means and fourth fastening means is disposed in a modular station, the stations forming a third line of stations with each station connected to an adjacent station by a conveyor;
   each of said fifth positioning means, fifth checking means and fifth fastening means is disposed in a modular station, the stations forming a fourth line of stations with each station connected to an adjacent station by a conveyor.

6. The apparatus according to claim 5, wherein said second line of stations is downstream from said first line of stations, said third line of stations is downstream from said second line of stations and said fourth line of station is downstream from said third line of stations.

7. The apparatus according to claim 6, wherein said first line of stations is arranged in a first plane, and said second, third and fourth lines of stations are arranged in a second plane, said first plane being parallel to said second plane.

8. The apparatus according to claim 7, further comprising means for transferring angle bracket assemblies from said first line to said second line.

9. The apparatus according to claim 8, further comprising a conveyor connecting said first line and said second line.

10. The apparatus according to claim 2, further comprising second testing means for testing the function of a finished window lock fitting.

11. The apparatus according to claim 2, wherein each of said third positioning means, third checking means and third fastening means is disposed in a modular station, the stations forming a second line of stations with each station connected to an adjacent station by a conveyor.

12. The apparatus according to claim 2, wherein each of said fourth positioning means, fourth checking means and fourth fastening means is disposed in a modular station, the stations forming a third line of stations with each station connected to an adjacent station by a conveyor.

13. The apparatus according to claim 2, wherein each of said fifth positioning means, fifth checking means and fifth fastening means is disposed in a modular station, the stations forming a fourth line of stations with each station connected to an adjacent station by a conveyor.

* * * * *